(12) United States Patent
Lenee-Bluhm et al.

(10) Patent No.: US 11,952,974 B2
(45) Date of Patent: Apr. 9, 2024

(54) WAVE ENERGY CONVERTER

(71) Applicant: Columbia Power Technologies, Inc., Charlottesville, VA (US)

(72) Inventors: Pukha Lenee-Bluhm, Corvallis, OR (US); Michael L. Ondusko, Longview, WA (US); Zhe Zhang, Corvallis, OR (US)

(73) Assignee: Columbia Power Technologies, Inc., Charlottesville, VA (US)

( * ) Notice: Subject to any disclaimer, the term of this patent is extended or adjusted under 35 U.S.C. 154(b) by 101 days.

(21) Appl. No.: 17/941,101

(22) Filed: Sep. 9, 2022

(65) Prior Publication Data

US 2024/0084775 A1 Mar. 14, 2024

(51) Int. Cl.
*F03B 13/22* (2006.01)

(52) U.S. Cl.
CPC .......... *F03B 13/22* (2013.01); *F05B 2250/44* (2020.08); *F05B 2260/406* (2013.01)

(58) Field of Classification Search
CPC . F03B 13/22; F05B 2250/44; F05B 2260/406
See application file for complete search history.

(56) References Cited

U.S. PATENT DOCUMENTS

| | | | |
|---|---|---|---|
| 3,651,870 A | * | 3/1972 | Calkins .................. A01B 39/19 172/311 |
| 4,098,084 A | * | 7/1978 | Cockerell ............... F03B 13/20 60/501 |

(Continued)

FOREIGN PATENT DOCUMENTS

| | | |
|---|---|---|
| WO | 2008063086 A2 | 5/2008 |
| WO | 2012106558 A2 | 8/2012 |

(Continued)

OTHER PUBLICATIONS

International Search Report and Written Opinion for corresponding International Application No. PCT/US23/72703 dated Jan. 31, 2024, 18 pages.

*Primary Examiner* — Pedro J Cuevas
(74) *Attorney, Agent, or Firm* — Pierce Atwood LLP

(57) ABSTRACT

A wave energy converter is provided which includes a nacelle having a starboard side and a port side axis, and housing a power take-off. The wave energy converter also includes at least one buoyancy member coupled to the nacelle, and a ballast tank coupled to the nacelle. The ballast tank, the at least one buoyancy member, and the nacelle, together form a first body, where the first body is coupled to the power take-off. The wave energy converter further includes a float and a drive arm forming a second body, where the second body is rotatably coupled to the first body about a coupling axis, and the second body is coupled to the power take-off. The second body is configured to rotate relative to the first body about the coupling axis within a radial span bounded by a proximal end of the float and a radially distal end of the float. According to one aspect, the first body has a center of mass and a center of buoyancy, and the coupling axis is offset from a line formed between the center of mass and the center of buoyancy of the first body. Methods for generating power with the wave energy converter are also provided.

18 Claims, 10 Drawing Sheets

(56) References Cited

U.S. PATENT DOCUMENTS

| | | | | |
|---|---|---|---|---|
| 4,118,932 A * | 10/1978 | Sivill | F03B 13/20 60/501 |
| 4,180,005 A * | 12/1979 | Zumbahlen | A01B 49/04 111/144 |
| 4,212,254 A * | 7/1980 | Zumbahlen | A01B 49/06 111/924 |
| 4,295,800 A * | 10/1981 | Packer | F03B 13/1815 60/499 |
| 4,319,454 A * | 3/1982 | Lucia | F03B 13/1815 60/505 |
| 4,389,843 A * | 6/1983 | Lamberti | F03B 13/1815 60/507 |
| 4,608,497 A * | 8/1986 | Boyce | F03B 13/20 244/17.11 |
| 4,718,231 A * | 1/1988 | Vides | F03B 13/1815 60/507 |
| 5,066,867 A * | 11/1991 | Shim | F03B 13/1885 60/495 |
| 5,132,550 A * | 7/1992 | McCabe | F03B 13/20 417/330 |
| 5,405,250 A * | 4/1995 | Vowles | F03B 13/1815 60/497 |
| 6,476,511 B1 * | 11/2002 | Yemm | F03B 13/20 290/53 |
| 7,315,092 B2 * | 1/2008 | Cook | F03B 13/20 60/507 |
| 7,444,810 B2 * | 11/2008 | Olson | F03B 13/1815 60/497 |
| 7,737,568 B2 * | 6/2010 | Vowles | F03B 13/182 290/53 |
| 7,759,813 B2 * | 7/2010 | Fujisato | F03B 13/1815 60/398 |
| 7,808,120 B2 * | 10/2010 | Smith | F03B 13/20 60/506 |
| 7,975,476 B2 * | 7/2011 | Hatzilakos | F03B 13/1815 60/497 |
| 8,304,925 B2 * | 11/2012 | Yang | F03B 13/20 290/53 |
| 8,314,506 B2 * | 11/2012 | Rhinefrank | F03B 13/20 290/53 |
| 8,508,063 B2 | 8/2013 | Rhinefrank et al. | |
| 8,618,686 B2 * | 12/2013 | Jo | F03B 13/20 290/53 |
| 8,659,179 B2 | 2/2014 | Rhinefrank et al. | |
| 8,686,582 B2 * | 4/2014 | Gardiner | F03B 13/20 290/53 |
| 8,841,788 B2 * | 9/2014 | Sampaio | F03B 13/20 290/53 |
| 9,068,553 B2 * | 6/2015 | McGrath | F03B 13/20 |
| 9,127,640 B2 | 9/2015 | Rohrer | |
| 9,587,620 B2 | 3/2017 | Rhinefrank et al. | |
| 9,863,395 B2 * | 1/2018 | Rohrer | F03B 13/182 |
| 10,094,356 B2 * | 10/2018 | Rohrer | H02K 7/18 |
| 10,184,445 B2 * | 1/2019 | Barry | F03B 15/00 |
| 10,267,286 B2 * | 4/2019 | Larsen | B63B 22/02 |
| 10,533,531 B2 * | 1/2020 | Vamvas | H02K 7/1823 |
| 10,767,618 B2 * | 9/2020 | Lehmann | F03B 13/20 |
| 10,788,010 B2 * | 9/2020 | Rohrer | F03B 13/182 |
| 10,947,951 B2 * | 3/2021 | Vamvas | H02K 7/1823 |
| 11,002,243 B2 * | 5/2021 | Lehmann | F03B 13/148 |
| 11,480,147 B2 * | 10/2022 | Vamvas | H02S 10/10 |
| 11,542,913 B1 * | 1/2023 | Hammagren | F03B 13/20 |
| 11,719,216 B2 * | 8/2023 | Siegel | F03B 13/10 416/85 |
| 2006/0208494 A1 * | 9/2006 | Cook | F03B 13/20 290/53 |
| 2008/0122225 A1 * | 5/2008 | Smith | F03B 13/1815 290/53 |
| 2009/0127856 A1 * | 5/2009 | Hench | F03B 13/20 700/286 |
| 2009/0158729 A1 * | 6/2009 | Hatzilakos | F03B 13/1815 60/497 |
| 2009/0230686 A1 | 9/2009 | Catlin | |
| 2010/0140944 A1 * | 6/2010 | Gardiner | F03B 13/16 290/53 |
| 2012/0153624 A1 * | 6/2012 | Sampaio | F03B 13/16 290/53 |
| 2012/0153627 A1 * | 6/2012 | Jo | F03B 13/20 290/53 |
| 2012/0317970 A1 * | 12/2012 | Edvardsen | F03B 13/20 60/498 |
| 2014/0097617 A1 * | 4/2014 | Rohrer | F03B 13/182 290/42 |
| 2015/0082785 A1 * | 3/2015 | Rohrer | F03B 13/186 60/500 |
| 2015/0252777 A1 * | 9/2015 | Rhinefrank | F03B 13/20 290/53 |
| 2016/0305395 A1 * | 10/2016 | Larsen | B63B 21/50 |
| 2017/0022964 A1 * | 1/2017 | Rohrer | F03B 13/186 |
| 2018/0306164 A1 * | 10/2018 | Lehmann | F03B 13/187 |
| 2018/0306165 A1 * | 10/2018 | Rohrer | F03B 13/186 |
| 2018/0372061 A1 * | 12/2018 | Vamvas | F03B 13/20 |
| 2019/0040840 A1 * | 2/2019 | Rohrer | F03B 13/1855 |
| 2019/0145373 A1 * | 5/2019 | Lehmann | F03B 13/148 290/53 |
| 2019/0368461 A1 * | 12/2019 | Korde | F03B 13/148 |
| 2020/0109694 A1 * | 4/2020 | Vamvas | H02K 7/1823 |
| 2020/0347818 A1 * | 11/2020 | Korde | F03B 13/20 |
| 2021/0285415 A1 * | 9/2021 | Vamvas | B63B 35/44 |
| 2021/0404436 A1 * | 12/2021 | Lehmann | F03B 13/186 |
| 2022/0316438 A1 * | 10/2022 | Siegel | F03B 13/16 |
| 2023/0151789 A1 * | 5/2023 | Hammagren | F03B 13/20 290/42 |
| 2023/0167797 A1 * | 6/2023 | Vamvas | B63B 35/44 290/53 |
| 2023/0358203 A1 * | 11/2023 | Montalvo Corral | F03B 13/187 |
| 2023/0407834 A1 * | 12/2023 | Polesel | F03B 13/20 |

FOREIGN PATENT DOCUMENTS

| | | | | |
|---|---|---|---|---|
| WO | 2017062528 A4 | 4/2017 | | |
| WO | 2017149302 A1 | 9/2017 | | |
| WO | WO-2019231699 A1 * | 12/2019 | | F03B 13/148 |

* cited by examiner

WAVE ENERGY CONVERTER

FIELD OF THE INVENTION

The present disclosure relates generally to converting wave surge and heave into energy and more particularly to wave energy conversion devices and methods.

BACKGROUND

Ocean energy, and wave energy in particular, represents a consistent, reliable and predictable energy resource that is widely available and close to many population centers. A majority of the world population lives within two hundred miles of an ocean, making the ocean an accessible source of renewable energy. Environmentally, waves also represent one of the most benign sources of clean renewable energy. This set of characteristics is unique to wave energy amongst the most widely available, global renewable energy resources.

Wave energy is a globally desirable resource and has the potential to be a cost-competitive and important component of a diverse mix of clean, renewable energy resources. A need exists for a wave energy conversion apparatus that efficiently and cost effectively converts the ocean wave energy into rotary motion for use in direct drive rotary generation while achieving improved reliability and survivability.

SUMMARY OF THE INVENTION

According to one aspect, a wave energy converter is provided which includes a nacelle having a starboard side and a port side, and the nacelle housing a power take-off. The wave energy converter also includes at least one buoyancy member coupled to the nacelle, and a ballast tank coupled to the nacelle, such that the ballast tank, the at least one buoyancy member, and the nacelle, together form a first body, where the first body is coupled to the power take-off. The wave energy converter further includes a float and a drive arm forming a second body, where the second body is rotatably coupled to the first body about a coupling axis, and where the second body is coupled to the power take-off. The second body is configured to rotate relative to the first body about the coupling axis within a radial span bounded by a proximal end of the float and a radially distal end of the float.

According to another aspect, a wave energy converter is provided which includes a nacelle having a starboard side and a port side, and the nacelle housing a power take-off. The wave energy converter also includes at least one buoyancy member coupled to the nacelle, and a ballast tank coupled to the nacelle, such that the ballast tank, the at least one buoyancy member, and the nacelle, together form a first body, where the first body is coupled to the power take-off. The wave energy converter further includes a float and a drive arm forming a second body, where the second body is rotatably coupled to the first body about a coupling axis, and where the second body is coupled to the power take-off. The second body is configured to rotate relative to the first body about the coupling axis within a radial span bounded by a proximal end of the float and a radially distal end of the float. Also, the first body has a center of mass and a center of buoyancy, where the coupling axis is offset from a line formed between the center of mass and the center of buoyancy of the first body.

According to yet another aspect, a method for generating power is provided. The method includes the steps of a) providing a wave energy converter including a nacelle having a starboard side and a port side, and the nacelle housing a power take-off. The wave energy converter also includes at least one buoyancy member coupled to the nacelle, and a ballast tank coupled to the nacelle, such that the ballast tank, the at least one buoyancy member, and the nacelle, together form a first body, where the first body is coupled to the power take-off. The wave energy converter further includes a float and a drive arm forming a second body, where the second body is rotatably coupled to the first body about a coupling axis, and where the second body is coupled to the power take-off. The second body is configured to rotate relative to the first body about the coupling axis within a radial span bounded by a proximal end of the float and a radially distal end of the float. The method also includes b) deploying the wave energy converter in a wave field.

DETAILED DESCRIPTION

The technology of the present disclosure relates to a wave energy converter (WEC) useful for transforming the energy associated with the heave and surge of offshore waves into rotational power. The present disclosure builds upon the technology disclosed in Applicant's earlier patents directed to WEC's which are discussed in U.S. Pat. No. 9,587,620 filed on Sep. 30, 2013, U.S. Pat. No. 8,508,063 filed on Oct. 22, 2012, U.S. Pat. No. 8,314,506 filed on Feb. 22, 2010, and U.S. Pat. No. 8,659,179 filed on Aug. 12, 2013, all of which are incorporated by reference herein in their entirety. These earlier patents disclose wave energy converter technology and describe in detail some of the internal components of the WEC.

As a general overview, a wave energy converter (WEC) may be used in a range of autonomous and grid-connected applications, including but not limited to low-power sensors, marine vehicles and vessels, desalination, aquaculture, offshore oil & gas platforms, and utility-scale grid connection. The WEC is a floating, multi-body system having a nacelle buoyantly supportable on a surface of a body of water that converts the heave and surge of offshore waves into rotational torque that may drive direct-drive generators or pumps.

The ultimate aim of a wave energy conversion device (WEC) is to convert one form of energy into another; in this case, in a chain including hydrodynamic conversion to power and ultimately to electricity or other readily transportable forms. Due to the nature of the energy resource, WEC's necessitate a unique set of design requirements including: extremely low speed; extremely high force; and cyclic, abrupt and chaotic motion.

The wind industry has demonstrated that a large-diameter direct-drive generator is a viable technical approach at slow speeds, and the WEC can do so as well with adjustment for the challenges presented by taking power off at extremely low speeds. Therefore, as discussed in Applicant's earlier patents listed above, various embodiments may utilize direct drive, thereby eliminating the need for a gearbox, improving reliability, and reducing the need for expensive marine maintenance operations.

As set forth in more detail below, aspects of the present disclosure are directed to a WEC with improved performance characteristics in comparison to prior WEC configurations. At a high level, the WEC may include a first body and a second body. Relative movement between these two bodies generates power in a power take-off.

Figure 8:
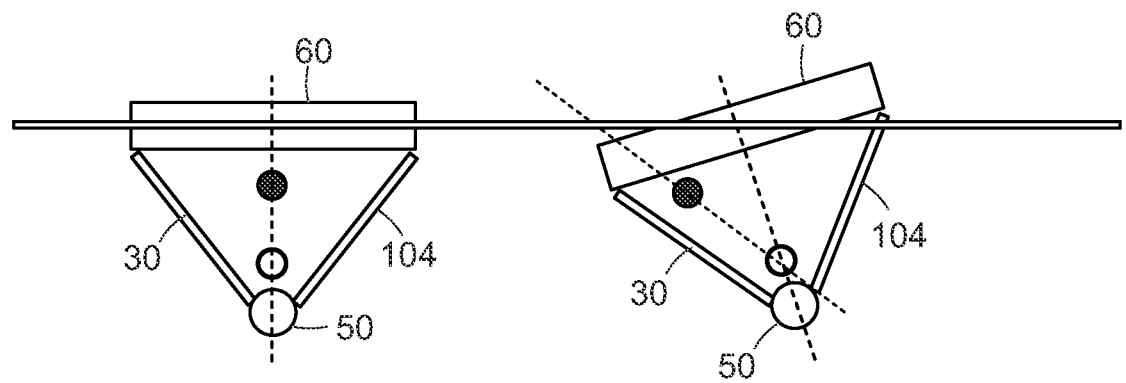
FIG. 8 is a schematic side view of a wave energy converter according to one embodiment.

As set forth in more detail below, portions of the WEC may act as a hydrostatic spring to improve energy capture. As a brief overview, the WEC may be designed so that the first body will tend to pitch about its center of mass. This is shown in FIG. 8 and is discussed in further detail below. However, first the general components of the WEC will be discussed.

The WEC and/or certain components of the WEC may be described as having a fore side, an aft side, a starboard side, and a port side, as it is common terminology to one of ordinary skill in the art. One of skill in the art will recognize that these customary terms are intended to provide some reference of one side relative to another side (i.e., the fore side is opposite the aft side, and the starboard side is opposite the port side, the port side is the left side when looking forward, and the starboard side is the right side when looking forward). Also, these terms may be used to describe a desired orientation for optimal energy capture. However, it should also be understood that because a WEC may move and/or rotate when deployed in a wave field in the water, that these terms are not intended to be limiting.

Turning now to FIGS. 1-6, one embodiment of a wave energy converter (WEC) 100 includes a buoyant nacelle 102. As set forth in more detail below, the nacelle 102 houses a power take-off. The WEC further includes at least one buoyancy member 60, 70 coupled to the nacelle 102. Furthermore, as shown, a ballast tank 50 is also coupled to the nacelle 102. As set forth in more detail below, the ballast tank 50 serves as the primary mass element for the first body, and it may be filled with a material such as, but not limited to, water, sand concrete, and/or PERMA BALLAST®, to sink it to its operating condition. The ballast tank 50, the at least one buoyancy member 60, 70, and the nacelle 102, together form a first body which is coupled to the power take-off that is housed within the nacelle 102.

As shown in FIGS. 1-4, the WEC 100 also includes a float 108 and a drive arm 110 forming a second body, where the second body is rotatably coupled to the first body about a coupling axis 20. The second body is also coupled to the power take-off, and the second body is configured to rotate relative to the first body about the coupling axis 20 within a radial span bounded by a proximal end 202 of the float 108 and a radially distal end 204 of the float 108. As shown in FIGS. 1-4, in one embodiment, the nacelle 102 has a longitudinal axis and the coupling axis 20 is aligned with the longitudinal axis. However, it is also contemplated that in another embodiment, the coupling axis 20 may be offset from the longitudinal axis of the nacelle 102.

In one embodiment, the float 108 is configured to travel a full 360° degrees around the nacelle 102. It should be recognized that in another embodiment, the float 108 may be configures to travel less than 360°. For example, there may be a mechanical stop to limit rotation of the float 108. In another embodiment discussed in more detail below, the float 108 may be configured to travel less than 360° in a configuration where the float arms are exterior to the buoyancy member 60. As set forth in more detail below, the second body is operatively coupled to the power take-off through the drive arm 110. As discussed in more detail below with reference to the embodiment shown in FIG. 7, the float 108 is operatively coupled to the power take-off mounted inside of the nacelle 102.

In one illustrative embodiment, the at least one buoyancy member 60, 70 includes a first buoyancy member 60 and a second buoyancy member 70. However, it should be appreciated that the present disclosure also contemplates embodiments with only one buoyancy member and/or more than two buoyancy members as the disclosure is not so limited. Furthermore, as shown in FIGS. 1-4, in one embodiment, the first buoyancy member 60 is coupled to the starboard side of the nacelle 102, and the second buoyancy member 70 is coupled to the port side of the nacelle 102.

In one particular embodiment, the first buoyancy member 60 is configured as a pontoon and the second buoyancy member 70 is also configured as a pontoon. In one embodiment, the first and second buoyancy members 60, 70 each have a substantially hollow cylindrical shaped body. One of ordinary skill in the art will recognize that in other embodiments, the at least one buoyancy member may be shaped and/or configured differently, such as, but not limited to a U-shaped buoyancy member, a rectangular cuboid that connects the pontoons, a shape having a raindrop cross-section, and/or an irregular shaped buoyancy member.

In the illustrative embodiment shown in FIGS. 1-4, the WEC 100 further includes a nacelle tube 80 having a first end extending outwardly from the starboard side of the nacelle 102 and a second end extending outwardly from the port side of the nacelle 102. As shown, a first buoyancy member 60 is coupled to the starboard side of the nacelle tube 80, and a second buoyancy member 70 is coupled to the port side of the nacelle tube 80. In this particular embodiment, the ballast tank 50 is coupled to both the first and second buoyancy members 60, 70. As shown, the ballast tank 50 extends substantially below the nacelle 102. A first spar 104 may extend downwardly from the first buoyancy member 60 to couple the first buoyancy member 60 to the ballast tank 50, and likewise, a second spar 106 (see FIG. 2) may extend downwardly from the second buoyancy member 70 to couple the second buoyancy member 70 to the ballast tank 50.

As set forth in more detail below, in one particular embodiment, the WEC has a first body which includes a plurality of buoyancy members 60, 70 which are each coupled to an end of a ballast tank 50 with a triangular spar configuration (with spars 104, 106 and knee braces 30, 32 as shown in see FIG. 4). In one embodiment, the WEC has a second body which includes a single float that rotates relative to the first body. As set forth in more detail below, the first body may be configured to provide a large restoring force.

Figure 11:
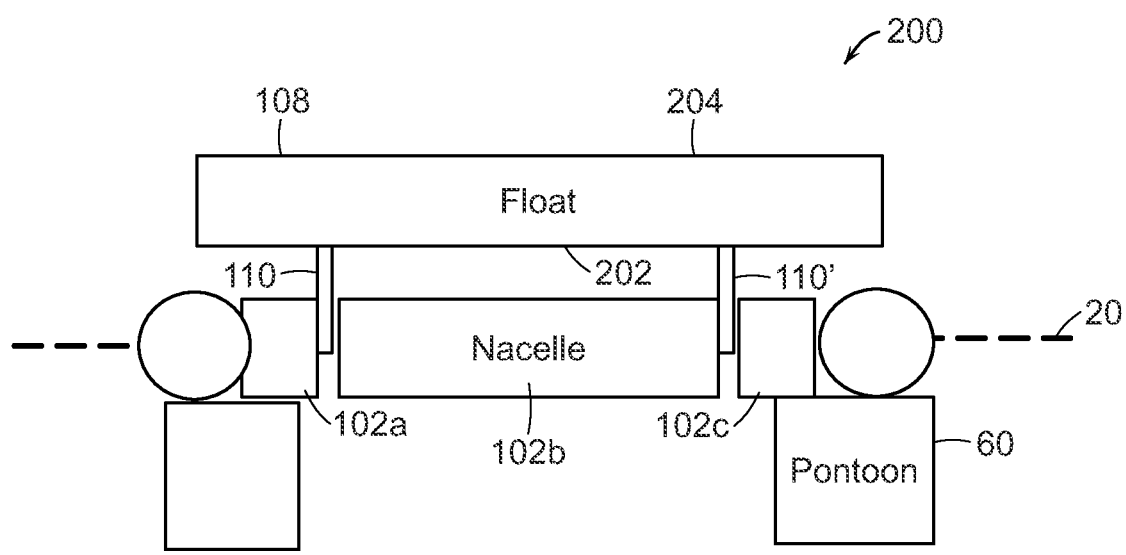
FIG. 11 is a schematic top view of a wave energy converter according to another embodiment.

Although a nacelle tube 80 is illustrated in FIGS. 1-4, the present disclosure also contemplates embodiments that either do not have a nacelle tube 80 or where the nacelle tube 80 is configured differently. For example, in one embodiment, a nacelle tube 80 may be interior to the nacelle such that there may not be a nacelle tube extending outwardly from the nacelle to the buoyancy member. One exemplary embodiment is shown in FIG. 11 and is discussed in more detail below.

Figure 4:
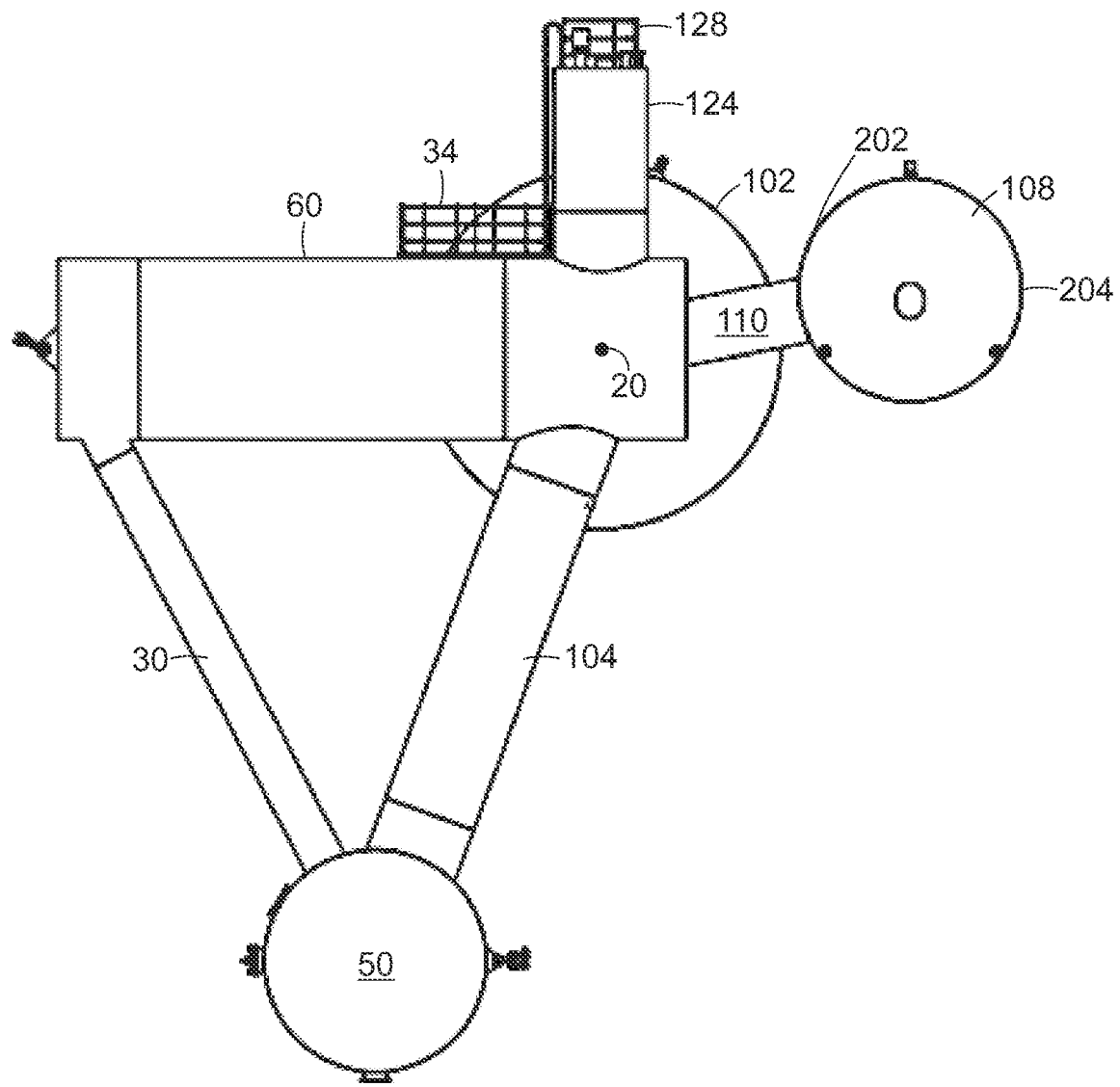
FIG. 4 is a side view of the wave energy converter shown in FIG. 1.
Figure 5:
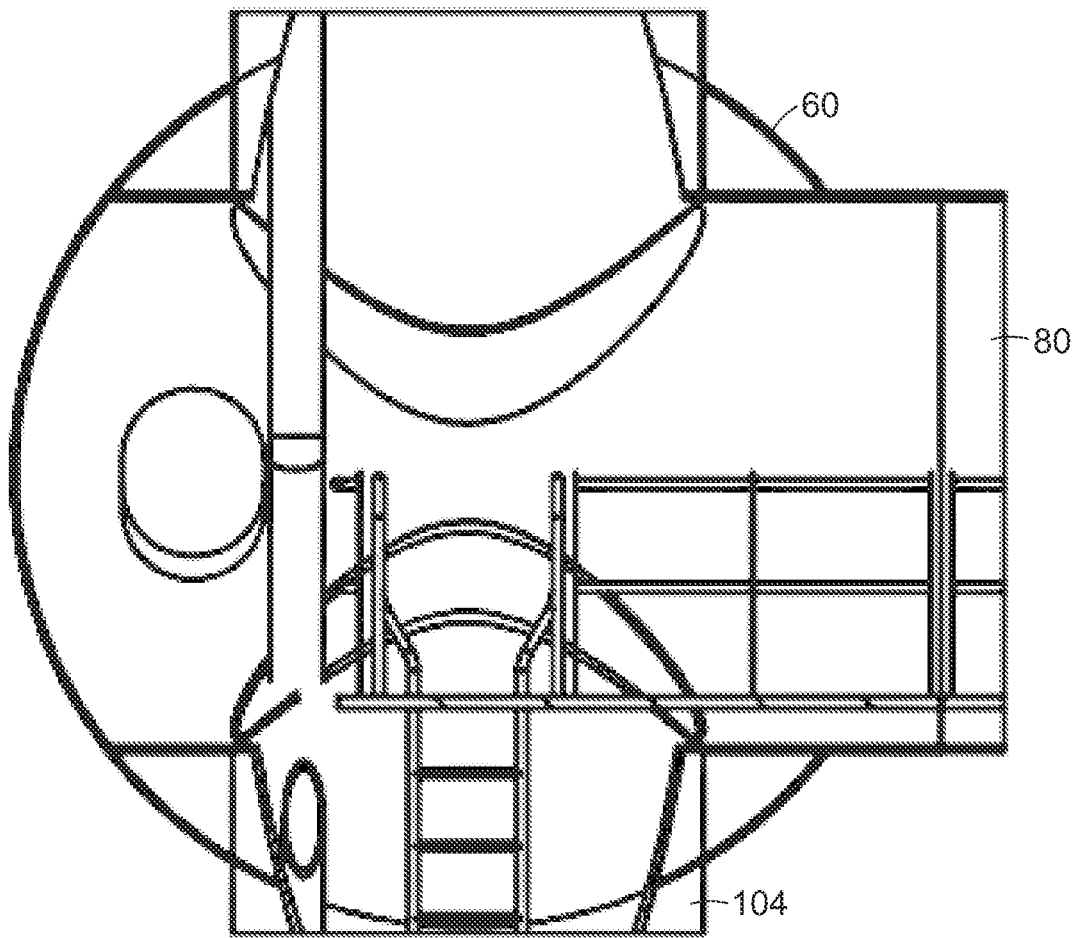
FIG. 5 is a detailed view of a buoyancy member-spar joint in a wave energy converter according to one embodiment.

As shown in FIGS. 1-6, the components of the first body (buoyancy members 60, 70, nacelle 102, ballast tank 50) and in this illustrative embodiment, also the nacelle tube 80, and spars 104, 106) are rigidly connected to each other. FIG. 5 is a detailed view of one embodiment of such a rigid connection which is a welded buoyancy member-spar joint. As shown in FIG. 5, the nacelle tube 80, the first buoyancy member 60 and the first spar 104 may be welded together at a first joint on the starboard side of the WEC 100. Similarly, the nacelle tube 80, the second buoyancy member 70 and the second spar 106 may be welded together at a second joint located on the port side of the WEC 100. Similar welding connections may secure the lower portion of each of the first and second spars 104, 106 to each end of the ballast tank 50. Although welding connections are shown, the present disclosure also contemplates other rigid connections such as, but not limited to, integrally formed components which may be molded or 3D printed, mechanical fasteners such as, but not limited to, bolts or clamps, and in one embodiment, an adhesive may be used.

Figure 1:
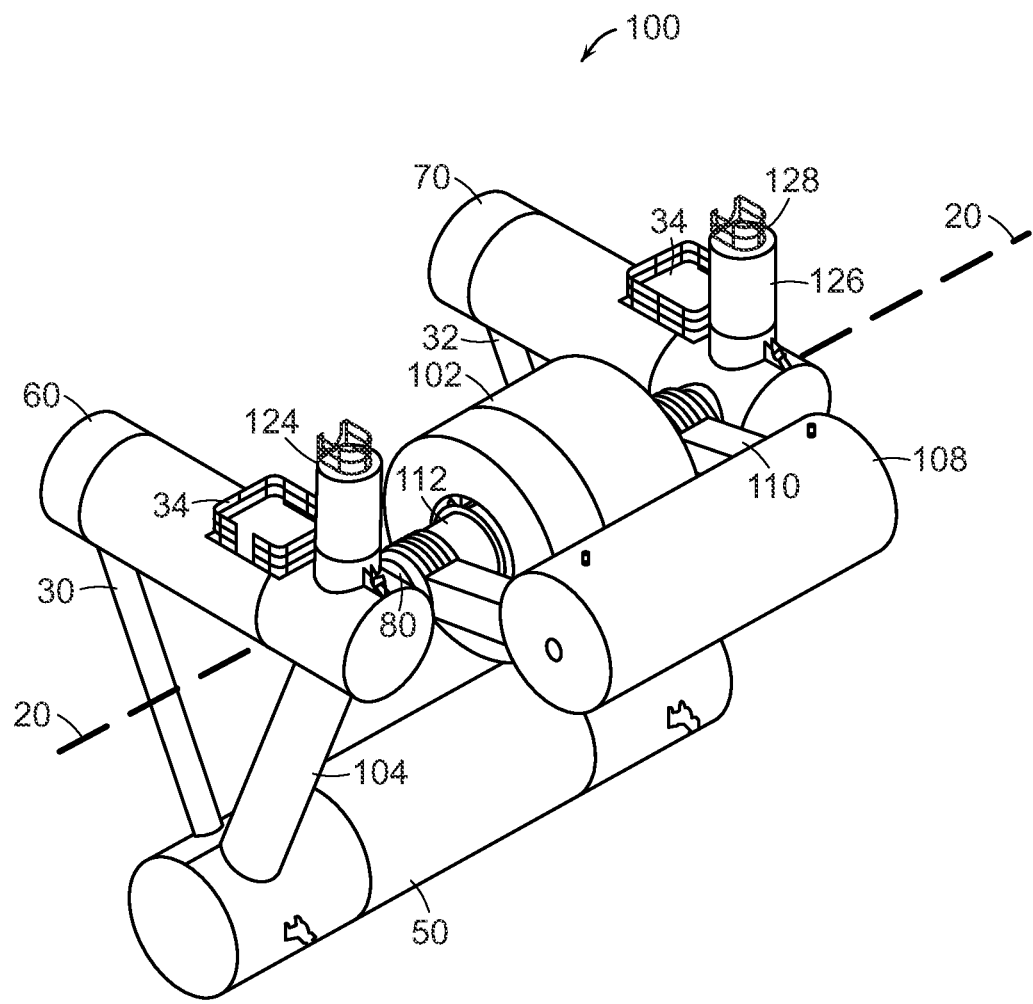
FIG. 1 is a perspective view of a wave energy converter according to one embodiment.
Figure 2:
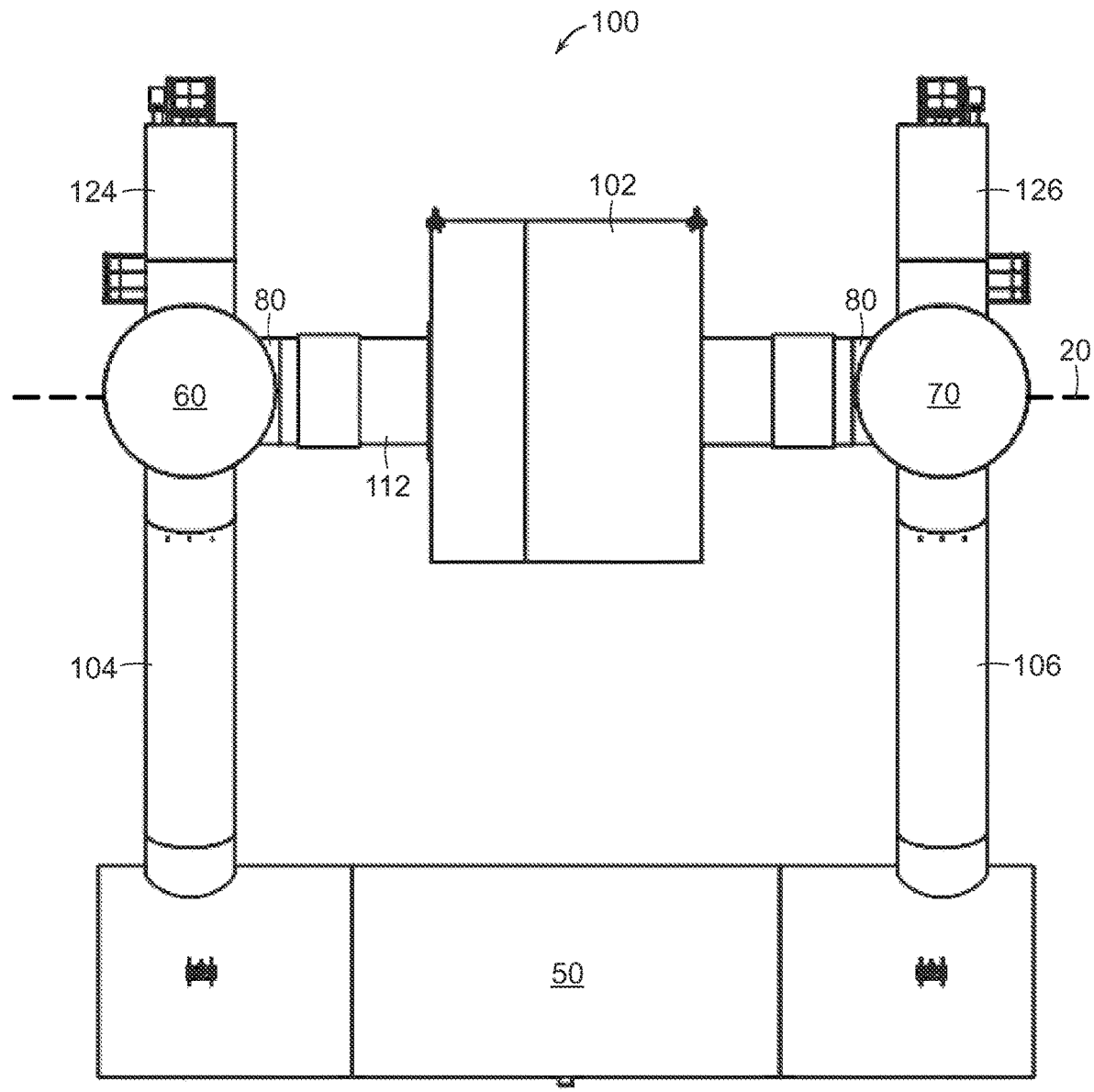
FIG. 2 is a front view of the wave energy converter shown in FIG. 1.
Figure 3:
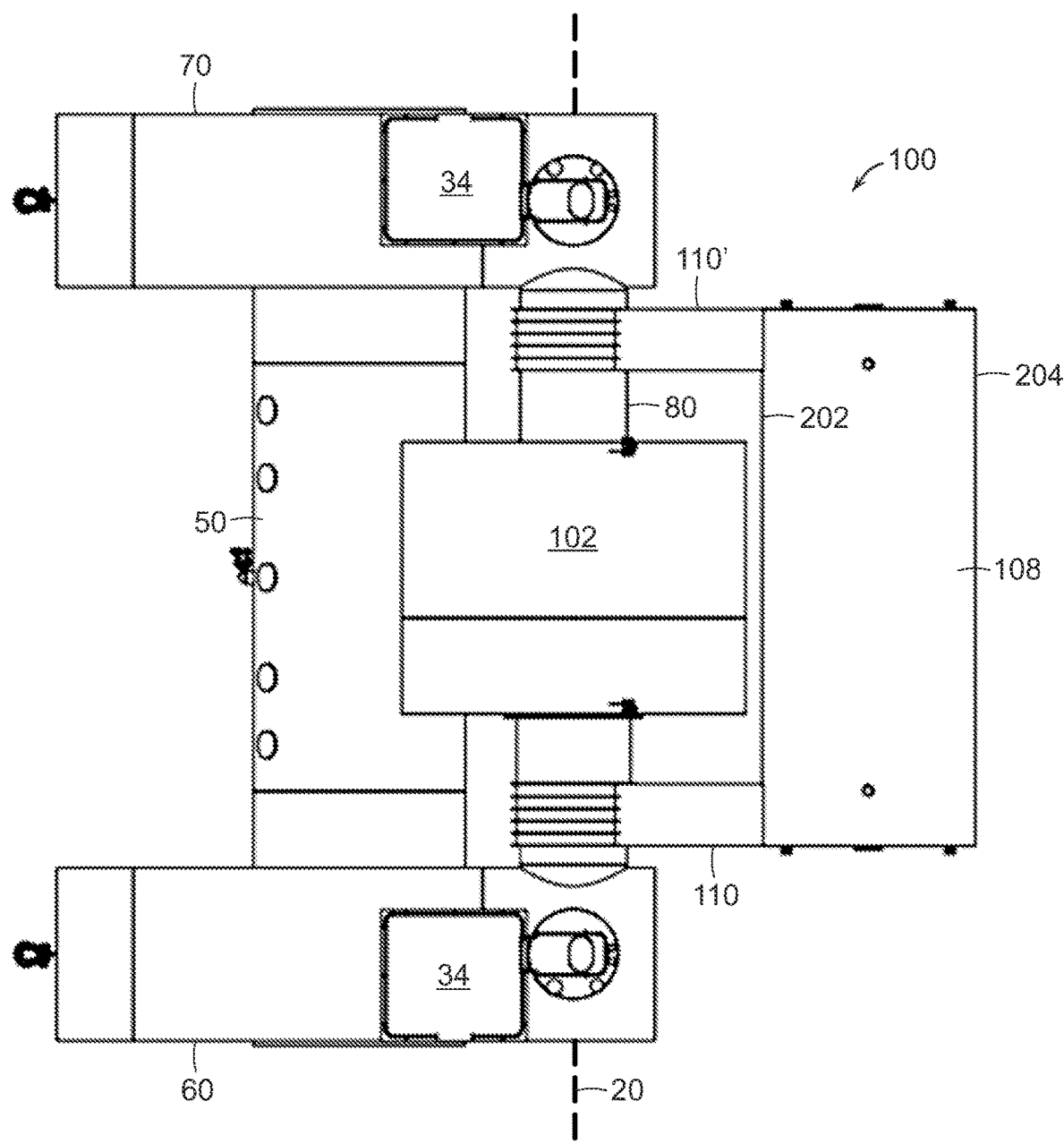
FIG. 3 is a top view of the wave energy converter shown in FIG. 1.

Furthermore, as shown in FIG. 1, in one illustrative embodiment, the first end of the nacelle tube 80 is coupled to a fore end (i.e. front facing) of the first buoyancy member 60. Similarly, as shown in FIG. 1, the second end of the nacelle tube 80 may be coupled to a fore end of the second buoyancy member 70. In one embodiment, the nacelle tube 80 is coupled to the first and second buoyancy members 60, 70 at the fore end of both buoyancy members 60, 70. As set forth in more detail below, this configuration may make the WEC act as a hydrostatic spring and improve energy capture of the WEC.

As shown in FIGS. 1-4, in one embodiment, the first and second buoyancy members 60, 70 both have an elongated configuration. As shown, a first end of the nacelle tube 80 may be coupled to an end of the elongated first buoyancy member 60, and the second end of the nacelle tube 80 may be coupled to an end of the elongated second buoyancy member 70.

In one embodiment, the first and second buoyancy members 60, 70, the nacelle 102, the nacelle tube 80, the ballast tank 50, and the float 108 each have a hollow substantially cylindrical shaped body. It is contemplated that a cylindrical shape may optimize the strength-to material and it may be easily fabricated which may reduce manufacturing costs. Other shapes, such as but not limited to rectangular, spherical, and irregular shaped bodies are also contemplated for one or more of these components.

As shown in FIGS. 1 and 4, in one illustrative embodiment, the WEC 100 further includes a first knee brace support 30 extending downwardly from the first buoyancy member 60 to the ballast tank 50 and a second knee brace support 32 extending downwardly from the second buoyancy member 70 to the ballast tank 50. It should be appreciated that the first and second knee brace supports 30, 32 are configured to provide additional supporting structure to the first body. As shown in the figures, in one illustrative embodiment, the first knee brace support 30 extends downwardly from an aft side (i.e. rear side) of the first buoyancy member 60, whereas the first spar 104 extends downwardly from the fore end of the first buoyancy member 60 such that together the first buoyancy member 60, the first spar 104, and the first knee brace support 30 form a triangular shaped configuration. Similarly, in one illustrative embodiment, the second knee brace support 32 extends downwardly from an aft side of the second buoyancy member 70, whereas the second spar 106 extends downwardly from the fore end of the second buoyancy member 70 such that together the second buoyancy member 70, the second spar 106, and the second knee brace support 32 also form a triangular shaped configuration on the other side of the WEC 100. It should be recognized that the first and second knee brace supports 30, 32 may be welded, or otherwise rigidly coupled to the ballast tank 50 and to their respective first and second buoyancy members 60, 70.

As shown, in one embodiment, the first and second spars 104, 106 and/or the first and second knee braces 30, 32 also each have a hollow substantially cylindrical shaped body. As mentioned above, it is contemplated that a cylindrical shape may optimize the strength-to material and it may be easily fabricated which may reduce manufacturing costs. Other shapes, such as but not limited to rectangular, spherical, and irregular shaped bodies are also contemplated for one or more of these components.

Furthermore, in one embodiment, the first and second spars 104, 106 and/or the first and second knee braces 30, 32 may be buoyant components. However, in another component, the first and second spars 104, 106 and/or the first and second knee braces 30, 32 (i.e. the coupling of the ballast tank 50 to the nacelle 102, nacelle tube 80 and/or buoyancy members 60, 70) may not be buoyant. It is contemplated that the knee braces 30, 32 and or spars 104, 106 may be rigid or non-rigid. For example, in one embodiment, the first and second spars 104, 106 and/or the first and second knee braces 30, 32 may include rigid components such as a beam, a truss, a steel plate, and/or a rod, as the present disclosure is not so limited. In one embodiment, non-rigid connections may be contemplated and for example, the first and second spars 104, 106 and/or the first and second knee braces 30, 32 may be made of chain, cable, strap, and/or rope.

Figure 9:
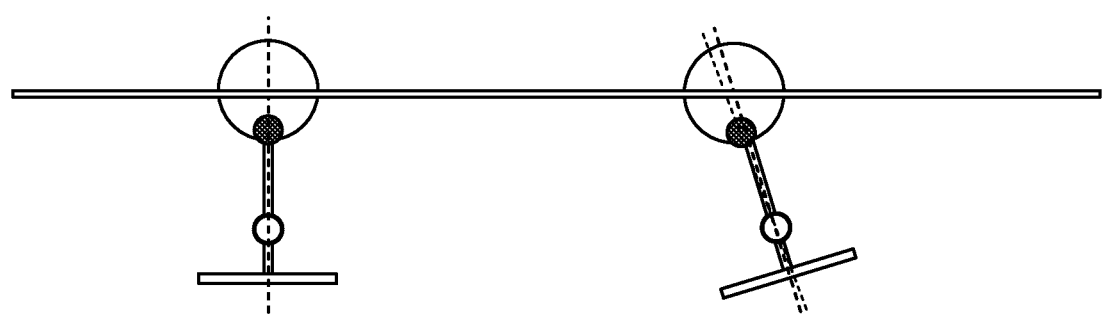
FIG. 9 is a schematic side view of a conventional wave energy converter.

As mentioned above, the present disclosure is directed to a WEC design with improved performance characteristics. As mentioned above, portions of the WEC may act as a hydrostatic spring to improve energy capture. The inventors recognized that by altering the center of mass vs. center of buoyancy relationship one can create instability of the WEC to optimize resonant response of the WEC which can lead to increased energy capture. In one embodiment, the first and second buoyancy members 60, 70 serve as the primary buoyancy elements of the first body, and the ballast tank 50 serves as the primary mass element for the first body. As shown in the schematic side view shown in FIG. 8, the first body will tend to pitch about its center of mass (which is kept low due to the ballast tank 50) so that the buoyancy members 60, 70 may act as a hydrostatic spring, exerting a significant restoring force torque. The vertical separation of the center of buoyancy and the center of mass, along with the orientation of the buoyancy member water plane area results in an accentuation of the restoring force as the WEC 100 pitches. This is in contrast to the schematic side view of a conventional WEC which is shown in FIG. 9. As shown in FIG. 9, there is a minimal restoring force, as the center of buoyancy of the first body does not substantially move as the body rotates in the water.

Figure 10:
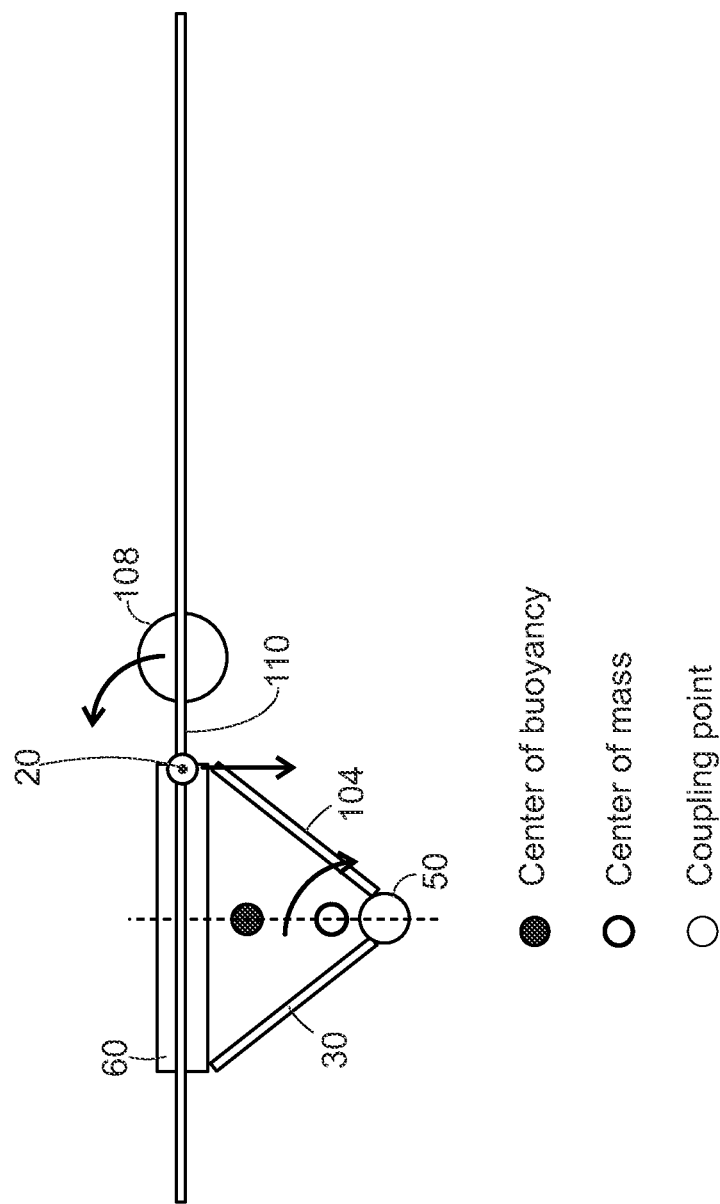
FIG. 10 is a schematic side view of a wave energy converter according to one embodiment.

According to aspects of the present disclosure, the second body, which includes the float 108 and the drive arm 110, may be optimized to have a response that is out of phase and/or out of amplitude with the first body, to maximize the relative motion for energy capture. FIG. 10 builds off of the schematic side view shown in FIG. 8 and further illustrates the coupling axis 20 between the first body (which includes at least one buoyancy member 60, ballast tank 50, and nacelle 102) and the second body (float 108 and drive arm 110). As shown, in one embodiment, the nacelle has a longitudinal axis and the coupling axis is aligned with the longitudinal axis of the nacelle 102. As shown in FIG. 10, a pitching motion of the first body results in a heaving motion at either end of the buoyancy members 60, 70. As the first body pitches forward (as shown by the clockwise arrow in FIG. 10, the relatively high mass first body forces the coupling point down into the water (as shown by the vertical arrow below the coupling axis 20). The relatively light and buoyant second body (float 108 and drive arm 110) is not as easily forced into the water and so it is forced to pitch upwardly (as shown by the counterclockwise arrow in FIG. 10) as the coupling point is forced down and the sea surface constrains the second body. Thus, a clockwise motion of the first body imposes a co-temporal counter-clockwise motion of the second body, which is ideal for energy capture.

In other words, as shown in FIG. 10, in one illustrative embodiment, the first body has a center of mass and a center of buoyancy. As shown, the coupling axis 20 is offset from a line formed between the center of mass and the center of buoyancy of the first body. As shown, the longitudinal axis of the nacelle 102 is also the coupling axis 20, about which the second body (float 108 and drive arm 110) rotates relative to the first body to generate energy in the WEC 100.

In one embodiment, the nacelle 102 may be described as a substantially watertight housing within which may be housed one or more rotary power take-offs. In another embodiment, the nacelle 102 may not be substantially watertight if the components inside are configured to withstand a marine environment and remain buoyant. In one embodiment, the nacelle 102 may include an empty buoyant shell, which may contain power generation, maintenance, and/or other equipment, or may be used for any other suitable purpose. It should be recognized that the nacelle outer shell (i.e. nacelle hull) may be part of the above-described first body along with the buoyancy members 60, 70 and ballast tank 50. In one embodiment discussed below, the nacelle 102 includes one power take-off. As set forth below, the present disclosure also contemplates embodiments with two or more power take-offs. As discussed in more detail below, as long as there is relative motion between the first body and the second body, energy can be generated in the power take-off.

As described above, in one embodiment, the first body (i.e. nacelle 102, at least one buoyancy member 60, 70 and ballast tank 50) and the second body (i.e. float 108 and drive arm 110) are operatively connected to one or more power take-offs (PTO) mounted within the nacelle 102. In another embodiment, the nacelle 102 and PTO may be incorporated into the at least one buoyancy member 60, 70. As shown in FIGS. 1, in one embodiment, the first body also includes a nacelle tube 80 that has a first end extending outwardly from the starboard side (i.e. right side) of the nacelle 102 and a second end extending outwardly from the port side (i.e. left side) of the nacelle 102. As shown in FIG. 1, the float arm 110 may include a first float arm 110 rotatably coupled to the starboard side of the nacelle tube 80, and a second float arm 110' rotatably coupled to the port side of the nacelle tube 80. It should be recognized that in one embodiment, one float arm 110 may act as the drive arm, and the other float arm 110' may act as the idler arm.

Figure 7:
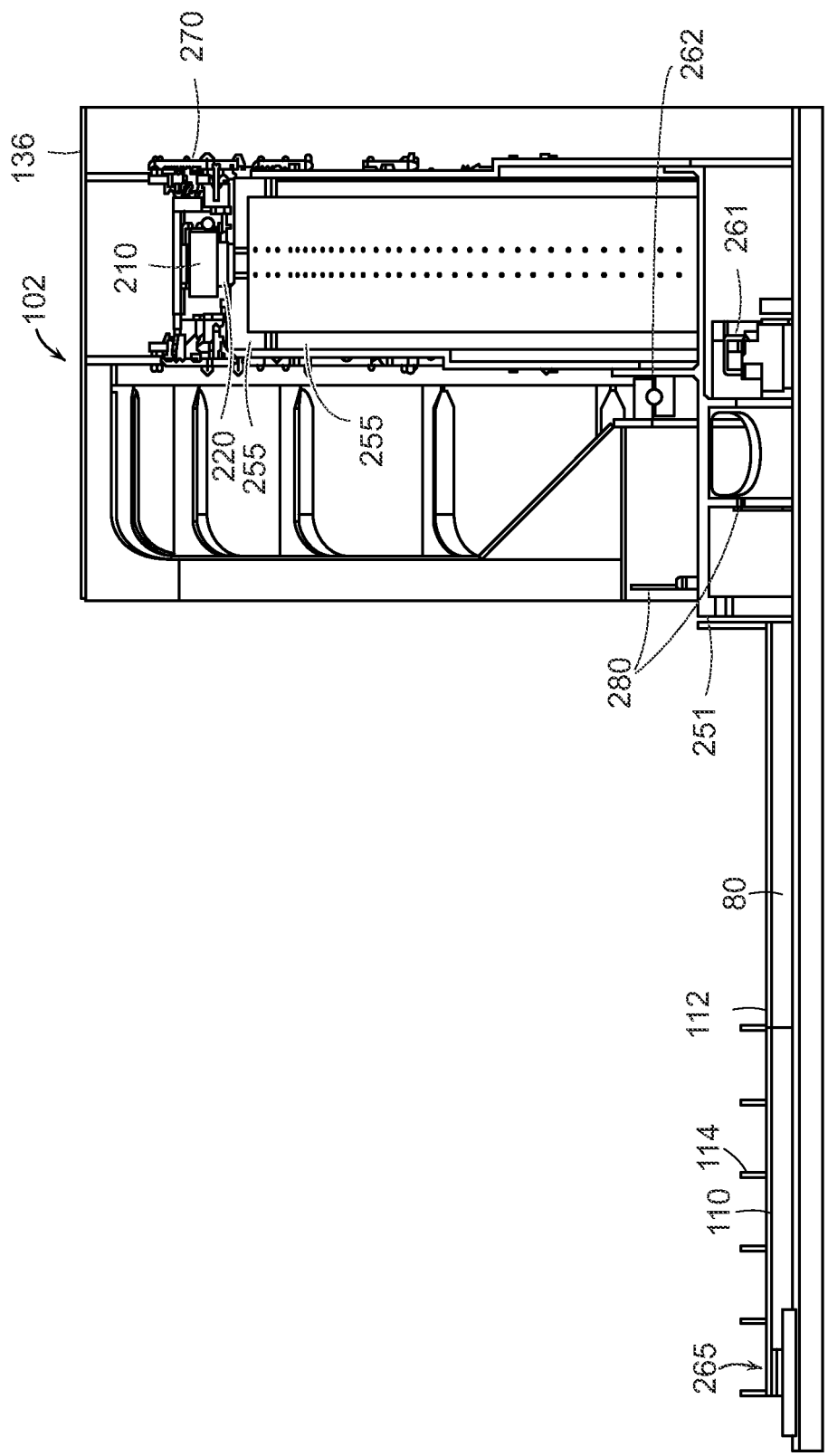
FIG. 7 is a detailed front cross-sectional view of a portion of the nacelle and nacelle tube according to one embodiment.

FIG. 7 illustrates a partial cross-sectional view of the nacelle 102 and the nacelle tube 80. As mentioned above, in one embodiment, the float 108 includes two spaced apart float arms 110, 110', one which acts as a drive arm, and the other which acts as an idler arm. In one embodiment, the drive arm is coupled to the nacelle tube 80 on one side of the nacelle 102, and the idler arm is coupled to the other side of the nacelle tube 80. FIG. 7 illustrates one side of the nacelle tube 80. It should be appreciated that the other side of the nacelle tube 80 may include similar components.

As shown in FIG. 7, one of the float arms 110, 110' may act as the drive arm and may be operatively coupled to a drive shaft 251 positioned inside of the nacelle 102. In one illustrative embodiment, a torque tube 112 extends outwardly from each side of the nacelle 102. The float arms 110, 110' may be coupled to the torque tube 112, such that movement of the float arms 110, 110' causes movement of the torque tube 112, which in turn causes movement of the drive shaft 251. As shown in FIG. 7, in one embodiment, the torque tube 112 may include a plurality of ribs 114 on each end which may be used to secure the float arms 110, 110' to the torque tube 112. As also shown in FIG. 7, bearings 265 may be provided to enable rotation of the float arm 110 and torque tube 112 relative to the inner nacelle tube 80. As set forth in greater detail in Applicant's earlier patents mentioned above, movement of the float arm 110 in turn moves the drive shaft 251 which in turn generates power or electricity in at least one power take-off inside of the nacelle. As discussed in more detail below, in one particular embodiment, the power take-off includes rotor components (220, 255) and stator components (210, 270) shown in FIG. 7. In one embodiment, relative movement between the second body and the first body generates energy in a power take-off.

Details regarding the specific PTO configuration may be found in Applicant's earlier patents directed to WEC's such as U.S. Pat. No. 9,587,620 filed on Sep. 30, 2013, U.S. Pat. No. 8,508,063 filed on Oct. 22, 2012, U.S. Pat. No. 8,314,506 filed on Feb. 22, 2010, and U.S. Pat. No. 8,659,179 filed on Aug. 12, 2013, all referenced above. As an overview, one of ordinary skill in the art will appreciate that such PTO may, in some embodiments, comprise one or more direct drive generator(s), gearbox drive generator(s), hydraulic system(s), pumping system(s), water pump(s), water desalinator(s), pneumatic pump(s), hydraulic pump(s), etc. For various pump and hydraulic-related embodiments, the drive shaft/hub may be directly or indirectly connected to, for example an impeller, compressor rotor, and/or mechanical turbine rotor. In some electrical generation embodiments the drive shaft/hub may be directly or indirectly connected to, for example, one or more rotors and/or stators. However, it will be understood, in view of this disclosure, that many design alternatives to the above exist for PTO components mounted within a nacelle and that these alternatives are within the scope of this disclosure.

As shown in FIG. 7, one of ordinary skill in the art will appreciate that in power generation applications, a rotary PTO may include one or more rotor segments 220, which are rotatable in relation to one or more stator segments 210. As set forth in more detail in Applicant's earlier patents listed above, relative rotation between the rotor segments 220 and stator segments 210 may be achieved by way of drive bearings 261, 262, or any other bearing or similar mechanism which allows one or more components to freely rotate about or within another component. The rotors may be operatively connected to any drive shaft/hub via any suitable means.

As shown in FIG. 7, the drive shaft 251 may generally rotate about the coupling axis on drive bearings or other suitable structures. In various embodiments, the drive shaft 251 may be sealed by one or more seals 280 to prevent the intrusion of seawater and/or harmful foreign objects/debris. In one embodiment, the power take-off is a direct drive generator having a rotor assembly and a stator assembly, where the rotor assembly rotates about the coupling axis 20. In one embodiment, the second body (float 108 and float arms 110, 110') is operatively coupled to the rotor assembly of the power take-off, and the first body (first and second buoyancy members 60, 70, nacelle tube 80 and ballast tank 50) is fixed to the stator assembly of the power take-off.

In one embodiment, the rotary PTOs may be a direct-drive system, (e.g., low-speed, high torque systems). Such systems have proven to represent a viable technical approach in connection with harnessing wind energy and the same slow-speed principles apply in the marine context. However, the technology described herein may be implemented using rotary PTOs of any type, including, but not limited to, generator(s), gearbox and generator(s), hydraulics and generator(s), water pump(s), and/or any other suitable rotary PTO device.

FIG. 7 provides a partial cross-sectional top-view of the nacelle 102 and nacelle tube 80. In the embodiment depicted in FIG. 7, one rotary PTO is provided. In power generation applications, such rotary PTOs may include one or more rotor segments 220, which are rotatable in relation to one or more stator segments 210. Depending on the application, stator segments 210 may be independently rotatable or retained in a fixed rotational position relative to the nacelle 102. As set forth in more detail below, relative rotation between the rotor segments 220 and stator segments 210, may be achieved by way of drive bearings, or any other bearing or similar mechanism which allows one or more components to freely rotate about or within another component.

In one embodiment, one or more rotor segments 220 may be integrated with a direct-drive shaft 251 and rotor hub/tire 255. As shown in FIG. 7 and as discussed above, a drive shaft/hub may be connected to a torque tube 112 which is connected to one or more rotors. However, it will be apparent in view of this disclosure that rotors may be operatively connected to any drive shaft/hub 251/255 via any other suitable means, including but not limited to, a gearbox or transmission, bolt-on, etc. Furthermore, as discussed in Applicant's earlier patents, one or more stator segments 210 may be fixedly or rotatably attached to the nacelle 102.

While FIG. 7 depicts a WEC 100 having one PTO, it will be apparent in view of this disclosure that any number of PTOs may be used. For example, in one embodiment, there may be two drive arms 110 coupled to the float 108, and both the first and the second drive arms rotatably couple the float 108 to the nacelle tube 80. In this embodiment, the second body (float 108 and associated drive arms) is operatively coupled to the power take-off through both the first and second drive arms 110.

In another embodiment, the power take-off includes a first power take-off and a second power take-off. In this embodiment, the second body may be operatively coupled to the first power take-off through the first drive arm, and the second body may be operatively coupled to the second power take-off through the second drive arm. In one embodiment, the first and second power take-offs are each direct drive generators having a rotor assembly and a stator assembly. The rotor assemblies of the first power take-off and the second power take-off may rotate about the coupling axis 20.

In yet another embodiment, the power take-off includes a first plurality of power take-offs and a second plurality of power take-offs. The second body may be operatively coupled to the first plurality of power take-offs through the first drive arm and the second body may be operatively coupled to the second plurality of power take-offs through the second drive arm. It is also contemplated that in one embodiment, multiple drive shafts could be provided and each drive shaft could drive one or more PTO's. One of ordinary skill in the art would appreciate that with the addition of mechanical components, such as gearing etc., multiple PTO's could be provided within the nacelle 102.

The nacelle 102, buoyancy members 60, 70, ballast tank 50, and spars 104, 106 may be produced from composite material (e.g., carbon fiber, Kevlar, fiberglass, etc.), concrete, rolled steel, aluminum, and/or any other suitable metal or alloy. In some embodiments, the nacelle 102 and/or buoyancy members 60, 70 may include access hatches 128 for loading/offloading equipment and personnel (e.g., for maintenance and repairs). In one embodiment, at least one of the nacelle 102, the nacelle tube 80, the first and second buoyancy members 60, 70, the first and second spar 104, 106, and the ballast tank 50 include one or more watertight modules. In one embodiment, each other above listed components are made of watertight modules.

As mentioned above, a first spar 104 and a second spar 106 couple the first and second buoyancy members 60, 70 to the ballast tank 50. A spar (e.g., 104, 106), as that term is used herein, comprises a hollow or solid elongate element. A cross-sectional shape of each spar 104, 106 may be any suitable shape (e.g., circular, triangular, airfoil shaped, elliptical, etc.). The spars 104, 106 may be produced from composite material (e.g., carbon fiber, Kevlar, fiberglass, etc.), concrete, rolled steel, aluminum, and/or any other suitable metal or alloy. Depending on scale, one or more of the spars 104, 106 may be hollow, compartmentalized, or modularized to house or provide ingress/egress for ballast, equipment, and personnel associated with power generation, maintenance, ballasting etc. The spars 104, 106 may generally be attached, directly or indirectly, to opposing ends of the ballast tank 50. In some embodiments, the first spar 104 is welded at one end to the first buoyancy member 60 on the starboard side of the nacelle tube 80, and the second spar 106 is welded at one end to the second buoyancy member 70 on the port side of the nacelle tube 80 however, it will be clear in view of this disclosure that other suitable attachment methods may be used.

Figure 6:
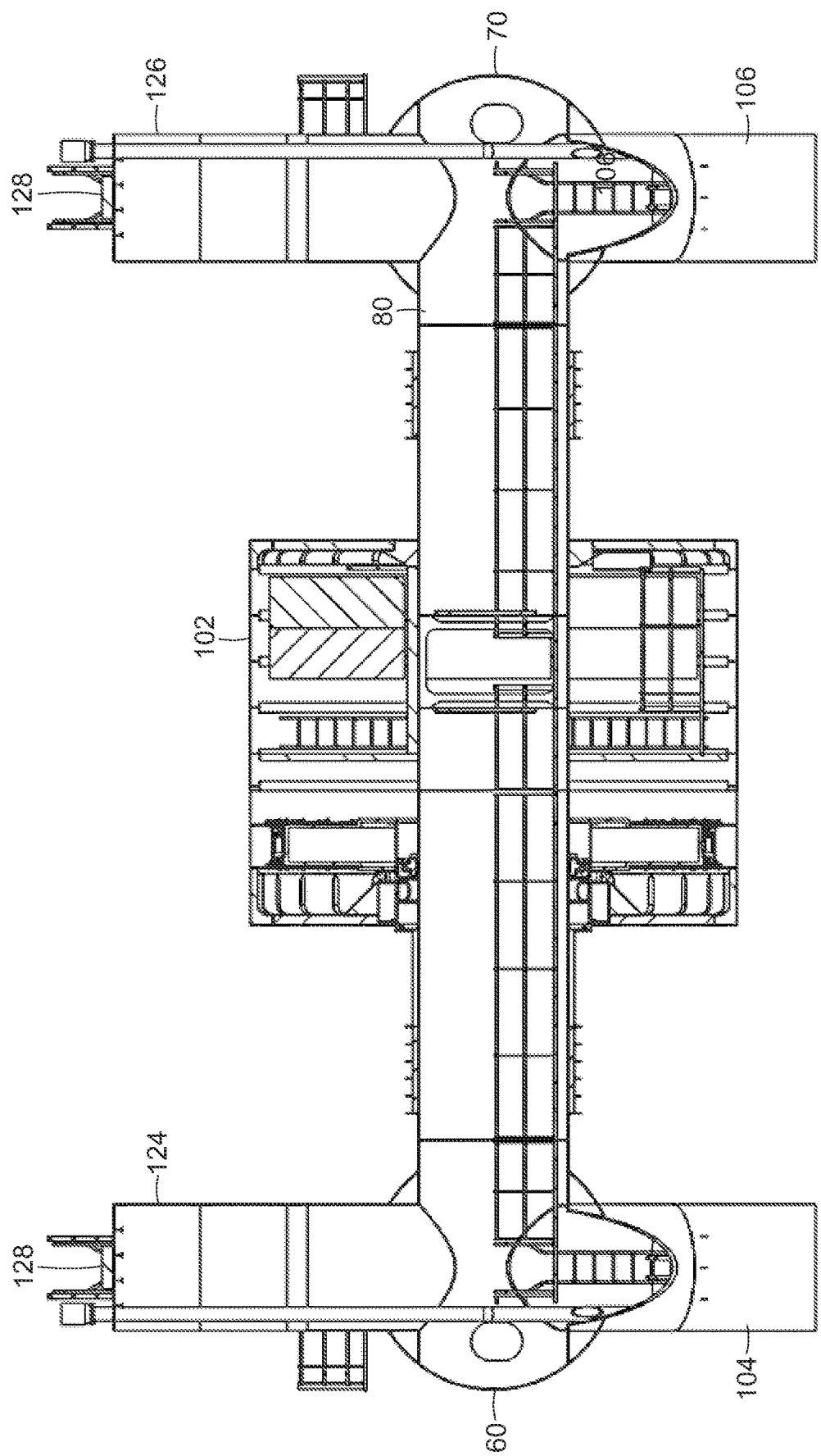
FIG. 6 is a top cross-sectional view of the wave energy converter according to one embodiment.

As shown in FIGS. 4 and 6, in some embodiments one or more upper spars 124, 126 can extend upward from the first and second buoyancy members 60, 70 to operate as a mooring mast or accessory (e.g., antenna, solar panel, warning light, etc.) mounting structure. As shown, various embodiments may include boarding areas 34 (e.g., service platforms and/or docking fixtures) attached to one or more of the spars 124, 126, and/or buoyancy members 60, 70 providing for improved service access for deployed WECs 100. A spar access hatch 128 may be provided on the upper spars 124, 126 and/or on the buoyancy members 60, 70. Spar access hatches 128 will generally be above water line in non-storm conditions and designed such that maintenance personnel and/or equipment can enter/exit the WEC 100 to gain further access to the components and interior equipment of the WEC 100.

FIG. 11 is a schematic top view of a wave energy converter according to another embodiment. This embodiment includes some of the above-described components, and thus some components have identical reference numbers. However, unlike some of the above-described embodiments, this particular embodiment does not have a nacelle tube which connects the nacelle 102 to the rest of the body. As shown, in this illustrative embodiment, the WEC 200 includes a three-piece nacelle 102a, 102b, 102c and one of the nacelle components 102a, 102b, 102c houses a power take-off. The WEC 200 also includes at least one buoyancy member 60 coupled to the nacelle 102a, 102b, 102c, and a ballast tank (not shown) may also be provided such that the ballast tank, nacelle 102a, 102b, 102c, and the at least one buoyancy member 60 form a first body coupled to the power take-off. A float 108 and a drive arm 110 form a second body which is rotatably coupled to the first body about a coupling axis 20 and the second body is also coupled to the power take-off. Furthermore, the second body is configured to rotate relative to the first body about the coupling axis 20 within a radial span bounded by a proximal end 202 of the float 108 and a radially distal end 204 of the float 108.

In this embodiment, the float 108 may include a float arm 110 that may act as the drive arm, and the other float arm 110' may act as the idler arm. The float/drive arm 110 may be located to the interior of the nacelle exterior walls, and the drive arm 110 may be rotatably coupled to the first body about the coupling axis at a location between two portions of the nacelle 102a, 102b. Similarly, the float idler arm 110' may also be located to the interior of the nacelle exterior walls, and the idler arm 110' may be rotatably coupled to the first body about the coupling axis at a location between two portions of the nacelle 102b, 102c. In one embodiment, there may be one buoyancy member 60 which extends across both the starboard side and the port side of the nacelle 102a, 102b, 102c. In another embodiment, there may be a first buoyancy member 60 on the starboard side of the nacelle and second buoyancy member 70 on the port side of the nacelle. As mentioned above, in one embodiment the buoyancy member 60 may be configured as a pontoon. In another embodiment, the at least one buoyancy member may be configured as a spar. FIG. 11 illustrates an embodiment where the float/drive arms 110, 110' are sandwiched between portions of the nacelle 102a, 102b, 102c. In another embodiment, the float/drive arms 110, 110' may be the external component on the starboard and port sides (i.e. the float/drive arms 110, 110' connect to the outside of the pontoon 60.

The present disclosure also contemplates methods for generating power which includes the steps of providing any of the above described novel wave energy converters, and deploying the wave energy converter in a wave field. As described above, movement of the first body and the second body generates energy in the one or more power take-offs housed within the nacelle.

It should be recognized that the WEC 100 may be configured to be either free floating or moored. One of ordinary skill in the art will appreciate that in one embodiment, it is configured to be moored and the WEC 100 includes a mooring system including one or more mooring lines which may be coupled to a mooring foundation and/or umbilical foundation (not shown). In one embodiment, the mooring system includes a mechanism for lengthening or shortening at least one mooring line.

The WEC may be towed along the water surface to its desired location. Once it is at the desired location, the ballast tank 50 and/or spars 104, 106 may be flooded with water to sink it to its operating condition. As mentioned above, the ballast tank serves as the primary mass element for the first body, and it may be filled with a material such as, but not limited to, water, sand concrete, and/or PERMA BALLAST®, to sink it to its operating condition. In one embodiment, the ballasting may be dynamic, where the material, such as water may be pumped in and out of particular compartments to improve performance. In one embodiment, dynamic ballasting may be used to fine tune the WEC to the specific wave climate.

Although several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto; the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified, unless clearly indicated to the contrary.

All references, patents and patent applications and publications that are cited or referred to in this application are incorporated in their entirety herein by reference.

What is claimed is:

1. A wave energy converter comprising:
a nacelle having a starboard side and a port side, the nacelle housing a power take-off;
at least one buoyancy member coupled to the nacelle;
a ballast tank coupled to the nacelle, such that the ballast tank, the at least one buoyancy member, and the nacelle, together form a first body, wherein the first body is coupled to the power take-off; and
a float and a drive arm forming a second body, wherein the second body is rotatably coupled to the first body about a coupling axis, wherein the second body is coupled to the power take-off; and wherein the second body is configured to rotate relative to the first body about the coupling axis within a radial span bounded by a proximal end of the float and a radially distal end of the float.

2. The wave energy converter of claim 1, wherein the at least one buoyancy member includes a first buoyancy member coupled to the starboard side of the nacelle, and a second buoyancy member coupled to the port side of the nacelle.

3. The wave energy converter of claim 2, wherein the first buoyancy member and the second buoyancy member each have a substantially cylindrical shaped body.

4. The wave energy converter of claim 2, wherein the first body further comprises a nacelle tube having a first end extending outwardly from the starboard side of the nacelle and a second end extending outwardly from the port side of the nacelle, wherein the first buoyancy member is coupled to the first end of the nacelle tube, and the second buoyancy member is coupled to the second end of the nacelle tube.

5. The wave energy converter of claim 4, further comprising:
a first spar extending downwardly from the first buoyancy member to the ballast tank;
a second spar extending downwardly from the second buoyancy member to the ballast tank; and
wherein the nacelle tube, the first buoyancy member and the first spar are coupled together at a first joint, and wherein the nacelle tube, the second buoyancy member and the second spar are coupled together at a second joint.

6. The wave energy converter of claim 4, wherein the first end of the nacelle tube is coupled to a fore end of the first buoyancy member, and wherein the second end of the nacelle tube is coupled to a fore end of the second buoyancy member.

7. The wave energy converter of claim 4, wherein the drive arm includes a first drive arm and a second drive arm, wherein both the first and second drive arms rotatably couple the float to the nacelle tube, wherein the second body is operatively coupled to the power take-off through both the first and second drive arms.

8. The wave energy converter of claim 7, wherein the power take-off includes a first power take-off and a second power take-off, wherein the second body is operatively coupled to the first power take-off through the first drive arm and the second body is operatively coupled to the second power take-off through the second drive arm.

9. The wave energy converter of claim 8, wherein the first and second power take-offs are each a direct drive generator having a rotor assembly and a stator assembly, and wherein the rotor assemblies of the first power take-off and the second power take-off rotate about the coupling axis.

10. The wave energy converter of claim 7, wherein the power take-off includes a first plurality of power take-offs and a second plurality of power take-offs, wherein the second body is operatively coupled to the first plurality of power take-offs through the first drive arm and the second body is operatively coupled to the second plurality of power take-offs through the second drive arm.

11. The wave energy converter of claim 1, wherein the nacelle, the at least one buoyancy member, the ballast tank and the float each have a substantially cylindrical shaped body.

12. The wave energy converter of claim 1, wherein the first body has a center of mass and a center of buoyancy, and wherein the coupling axis is offset from a line formed between the center of mass and the center of buoyancy of the first body.

13. The wave energy converter of claim 1, wherein the nacelle has a longitudinal axis, and wherein the coupling axis is aligned with the longitudinal axis of the nacelle.

14. The wave energy converter of claim 1, wherein the power take-off is a direct drive generator having a rotor assembly and a stator assembly, wherein the second body is operatively coupled to the rotor assembly of the power take-off, and the first body is fixed to the stator assembly of the power take-off.

15. The wave energy converter of claim 1, wherein the second body further comprises an idler arm rotatably coupling the float to the nacelle.

16. A wave energy converter comprising:
a nacelle having a starboard side and a port side, the nacelle housing a power take-off;
at least one buoyancy member coupled to the nacelle;
a ballast tank coupled to the nacelle, such that the ballast tank, the at least one buoyancy member, and the nacelle, together form a first body, wherein the first body is coupled to the power take-off;
a float and a drive arm forming a second body, wherein the second body is rotatably coupled to the first body about a coupling axis, wherein the second body is coupled to the power take-off;
wherein the second body is configured to rotate relative to the first body about the coupling axis within a radial span bounded by a proximal end of the float and a radially distal end of the float; and
wherein the first body has a center of mass and a center of buoyancy, and wherein the coupling axis is offset from a line formed between the center of mass and the center of buoyancy of the first body.

17. The wave energy converter of claim 16, wherein the first body further comprises a nacelle tube having a first end extending outwardly from the starboard side of the nacelle and a second end extending outwardly from the port side of the nacelle.

18. A method for generating power comprising the steps of:
a) providing a wave energy converter comprising:
a nacelle having a starboard side and a port side, the nacelle housing a power take-off;
at least one buoyancy member coupled to the nacelle;
a ballast tank coupled to the nacelle, such that the ballast tank, the at least one buoyancy member, and the nacelle, together form a first body, wherein the first body is coupled to the power take-off; and
a float and a drive arm forming a second body, wherein the second body is rotatably coupled to the first body about a coupling axis, wherein the second body is coupled to the power take-off; and
wherein the second body is configured to rotate relative to the first body about the coupling axis within a radial span bounded by a proximal end of the float and a radially distal end of the float; and
b) deploying the wave energy converter in a wave field.

* * * * *